(12) United States Patent
Kaito et al.

(10) Patent No.: US 7,391,623 B2
(45) Date of Patent: Jun. 24, 2008

(54) DISPLAY MODULE AND PORTABLE TERMINAL APPARATUS

(75) Inventors: Yoshihiko Kaito, Kawasaki (JP); Shigeru Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 411 days.

(21) Appl. No.: 11/233,029

(22) Filed: Sep. 23, 2005

(65) Prior Publication Data
US 2006/0232918 A1 Oct. 19, 2006

(30) Foreign Application Priority Data
Apr. 18, 2005 (JP) ............................. 2005-119729

(51) Int. Cl.
H05K 7/02 (2006.01)
H05K 7/14 (2006.01)
(52) U.S. Cl. ................... 361/807; 361/800; 361/816; 361/818; 361/752; 361/728; 174/520
(58) Field of Classification Search ............... 361/730, 361/728, 736, 752, 807, 809, 800, 818, 816; 174/350, 520
See application file for complete search history.

(56) References Cited

U.S. PATENT DOCUMENTS

| | | | | |
|---|---|---|---|---|
| 5,150,282 A | * | 9/1992 | Tomura et al. | 361/818 |
| 5,438,482 A | * | 8/1995 | Nakamura et al. | 361/816 |
| 5,596,487 A | * | 1/1997 | Castaneda et al. | 361/814 |
| 5,633,786 A | * | 5/1997 | Matuszewski et al. | 361/818 |
| 5,777,856 A | * | 7/1998 | Phillips et al. | 361/816 |
| 6,011,699 A | * | 1/2000 | Murray et al. | 361/814 |
| 6,058,293 A | * | 5/2000 | Phillips | 455/575.1 |
| 6,353,465 B1 | | 3/2002 | Hashimoto et al. | |
| 6,501,019 B2 | * | 12/2002 | Sato et al. | 174/377 |
| 6,576,832 B2 | * | 6/2003 | Svarfvar et al. | 174/392 |
| 7,177,161 B2 | * | 2/2007 | Shima | 361/816 |

FOREIGN PATENT DOCUMENTS

JP 2000-307258 11/2000
JP 2005-19850 1/2005

* cited by examiner

*Primary Examiner*—Tuan Dinh
*Assistant Examiner*—Dameon E Levi
(74) *Attorney, Agent, or Firm*—Kratz, Quintos & Hanson, LLP (57) ABSTRACT

The present invention provides a display module having: a display board on which a display element displaying an image is mounted; and a chassis on which the display board is mounted and which is placed on a circuit board. The chassis has a support board and a frame plate. The support board includes: a support section which supports a portion of the display board except for a corner section of the display board; and a depressed section which continuously expands from the support section and is formed such that a surface on a side supporting the display board is lower than the support section. The frame plate is placed on the circuit board while supporting the support board at a predetermined height with respect to the circuit board.

7 Claims, 7 Drawing Sheets

PRIOR ART

Fig. 7

PRIOR ART

DISPLAY MODULE AND PORTABLE TERMINAL APPARATUS

BACKGROUND OF THE INVENTION

1. Field of the Invention

The present invention relates to a portable terminal apparatus such as a mobile phone handset and a display module which is mounted on the portable terminal apparatus or the like to display an image.

2. Description of the Related Art

A portable terminal apparatus in recent years is additionally provided with an image display function, and liquid crystals, organic EL (Electro Luminescence), or the like is used in its display device. Glass is generally used for such a display device. Since a portable terminal apparatus is a device to be carried around by a person, an external force such as a strong compressive force or an impactive force is frequently applied to the portable terminal apparatus during use. However, a glass which is used for a display device is sensitive to an external force, and a glass breakage may occur, causing a display problem.

Typically, in a portable terminal apparatus, a display device is reinforced and fixed by a chassis structure. From a structural viewpoint, a glass breakage in the display device is often caused by an external force in a direction of the display surface. An external force causes a chassis to bend, and a glass edge interferes with the chassis, thereby causing a glass breakage. Japanese Patent Laid-Open No. 2000-307258 discloses a housing structure which is aimed at solving the problem and is hard to break even if an external force is applied.

In a portable terminal apparatus, an integrated circuit component which operates at a high frequency is packaged on an electrical component. It is necessary for the portable terminal apparatus to avoid the influence of radiation noise generated from the integrated circuit component and the like. Japanese Patent Laid-Open No. 2005-19850 discloses an electromagnetic interference shielding structure for avoiding the influence of radiation noise and the like.

Figure 6:
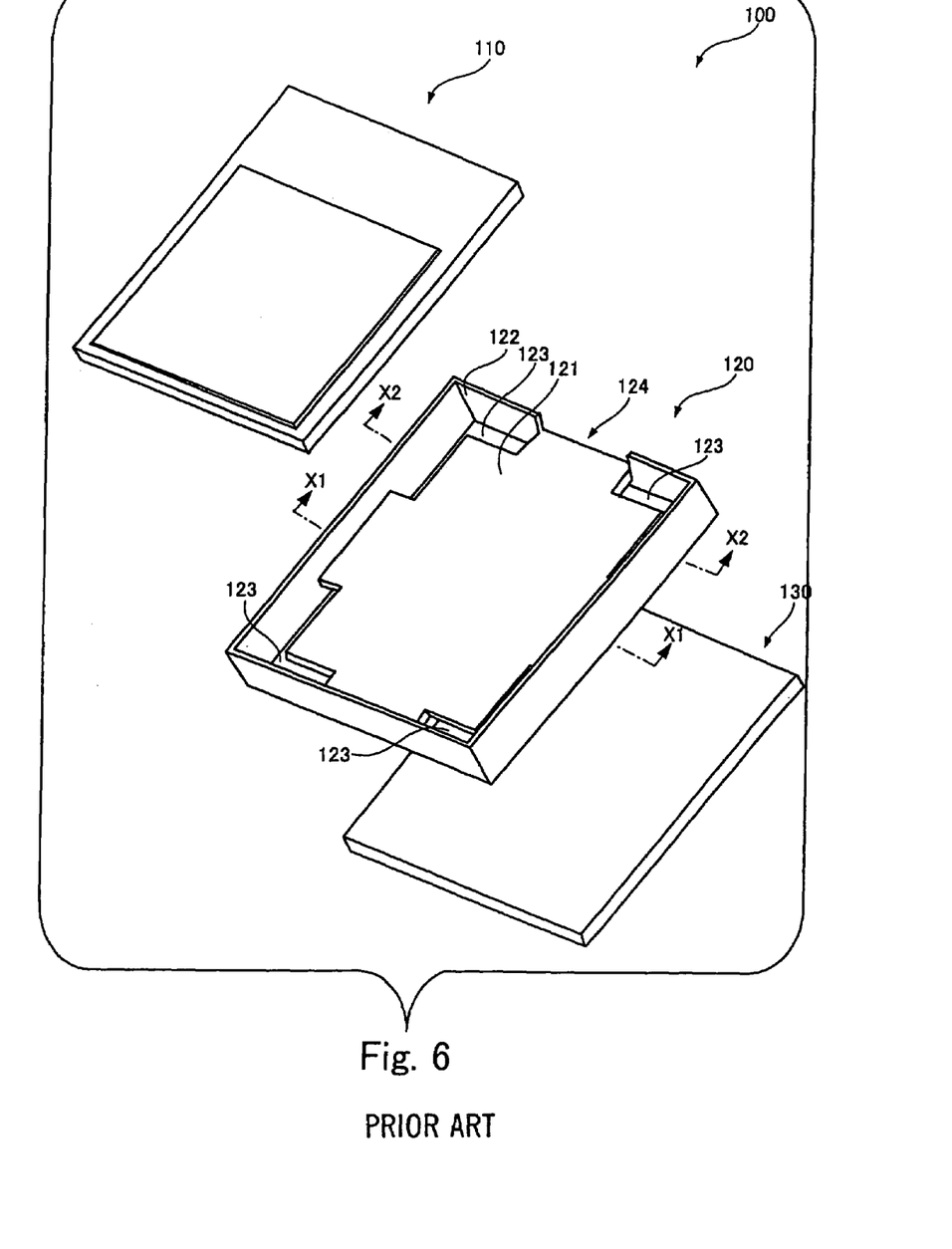
FIG. 6 is an exploded perspective view showing the structure of a conventional display module.

FIG. 6 is an exploded perspective view showing the structure of a conventional display module intended to prevent a glass breakage upon application of an external force and avoid the influence of radiation noise and the like.

A display module 100 shown in FIG. 6 is composed of a display board 110 on which an EL display element displaying an image is mounted and which is made of a glass material, a chassis 120 which is made of a resin material such as ABS, and a sheet metal component 130 which is made of a metal material.

The chassis 120 is formed of a support board 121 which supports the display board 110 and a frame plate 122 which surrounds the support board 121 to support it. In the chassis 120, openings 123 vertically extending between the support board 121 and the frame plate 122 are formed at portions which correspond to the four corner sections of the display board 110 when the display board 110 is placed on the support board 121.

The chassis 120 is configured such that the support board 121 bends to absorb an external force when the external force is applied to the display board 110, and the display board 110 is pressed. If the support board 121 expands so as to fill the openings 123 in the four corners, the support board 121 may interfere with the display board 110 at the four corners to cause a glass breakage in the display board 110. In this arrangement, the openings 123 are formed in the four corners to avoid such a breakage. The provision of these openings 123 prevents a glass breakage even if an external force is applied.

A notch section 124 is formed in a part of the frame plate 122 of the chassis 120. A flexible board (not shown) extending from the display board 110 passes through the notch section 124.

The sheet metal component 130 has the shape of a box facing downward. The shape will be described with reference to parts (A) and (B) of FIG. 7.

Figure 7:
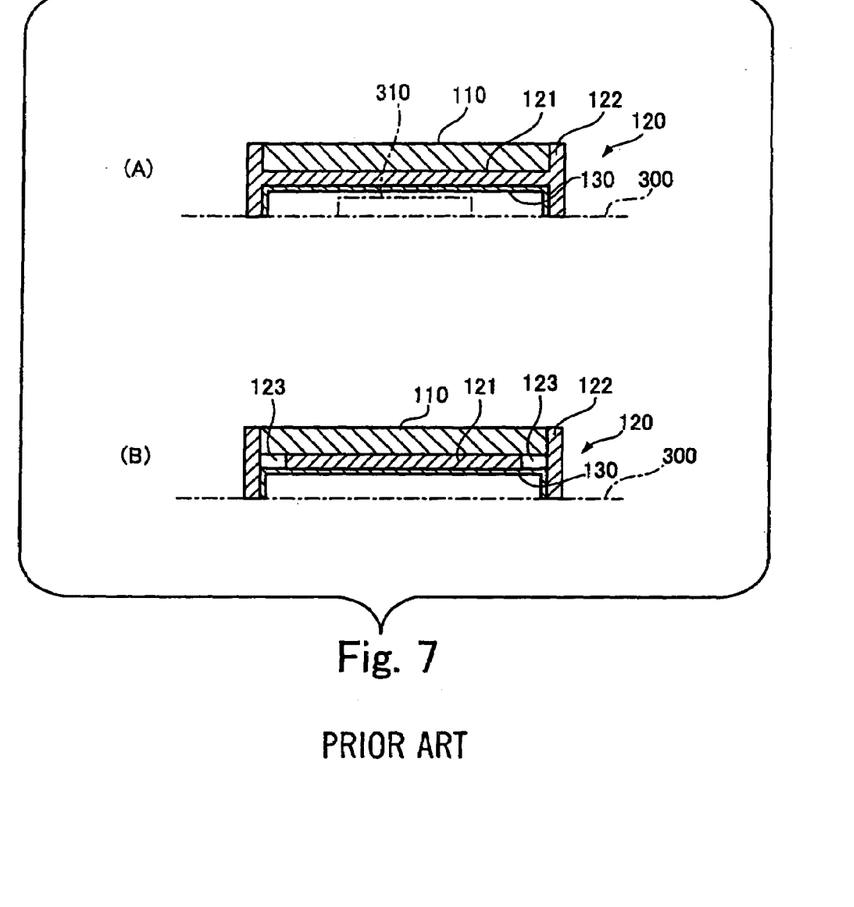
FIG. 7 is a diagram showing sectional views, respectively, taken along arrows X1-X1 and X2-X2 shown in FIG. 6.

Parts (A) and (B) of FIG. 7 are sectional views, respectively, taken along arrows X1-X1 and X2-X2 shown in FIG. 6. For illustrative convenience, in FIG. 6, the arrows X1-X1 and X2-X2 indicate the positions of sections of the chassis 120. Parts (A) and (B) of FIG. 7 show the structures of the sections, including the display board 110 and sheet metal component 130, at the positions corresponding to the arrows X1-X1 and X2-X2.

Part (A) of FIG. 7 is a sectional view taken along the arrow X1-X1 shown in FIG. 6; and part (B) of FIG. 7, a sectional view taken along the arrow X2-X2 shown in FIG. 6.

The frame plate 122 of the chassis 120 is placed on a circuit board 300 while supporting the support board 121 at a predetermined height with respect to the circuit board 300. The sheet metal component 130 has the shape of a box facing downward, as shown in parts (A) and (B) of FIG. 7. The sheet metal component 130 is fit in a portion delimited by the frame plate 122 and the back surface of the support board 121 of the chassis 120 and is placed on the circuit board 300 together with the frame plate 122. The sheet metal component 130 is connected to electrical ground on the circuit board 300 through a structure (not shown). A circuit component 310 such as an IC chip is mounted at a portion, opposing the center of the support board 121, of the circuit board 300. The sheet metal component 130 connected to ground surrounds the circuit component 310 to give the shielding effect to the circuit component 310. This arrangement prevents radiation noise and the like from the circuit component 310 from leaking outside.

Part (B) of FIG. 7 also shows the openings 123 described with reference to FIG. 6. As described above, with the presence of these openings 123, no interference occurs between the corner sections of the display board 110 and the support board 121 even if an external force is applied to the display board 110, and the support board 121 bends. This prevents the occurrence of a glass breakage in the display board 110.

Conventionally, the display module 100 with the structure shown in FIG. 6 and parts (A) and (B) of FIG. 7 is adopted as an example. However, it is desired to further promote a reduction in weight and the number of components, and the like demanded of a portable terminal apparatus.

SUMMARY OF THE INVENTION

The present invention has been made in view of the above circumstances and provides a display module intended to further reduce the weight and the number of components and a portable terminal apparatus on which the display module is mounted.

According to the present invention, there is provided a display module including:

a display board on which a display element displaying an image is mounted; and a chassis on which the display board is mounted and which is placed on a circuit board, wherein the chassis has:

a support board having a support section which supports a portion except for a corner section of the display board and a depressed section which continuously expands from the support section and is formed such that a surface on a side supporting the display board is lower than the support section by one level, and a frame plate which is placed on the circuit board while supporting the support board at a predetermined height with respect to the circuit board.

In the display module of the present invention, the support board has a depressed section at a portion corresponding to a corner section of the display board in addition to the support section. Accordingly, even if the openings 123 as shown in FIG. 6 and part (B) of FIG. 7 are not provided, interference which may occur when an external force causes the support board to bend is avoided between the corner section of the display board and the support board. When the chassis of the present invention is placed on the circuit board, a closed space is formed between the circuit board and the chassis even without the sheet metal component 130 shown in FIG. 6 and FIG. 7. Accordingly, by, for example, forming the chassis of a conductive material, or the like, radiation noise and the like is prevented from leaking from a circuit component mounted on the circuit board within the closed space.

In the display module of the present invention, a conductor film is preferably formed on a back surface of the support board facing the circuit board when the support board is placed on the circuit board.

The adoption of a structure in which a conductor film is formed makes it possible to maintain good shielding performance even if the chassis itself is made of a non-conductive resin or the like.

In the display module of the present invention, the depressed section is preferably formed so as to protrude on the back surface of the support board by one level.

By forming the depressed section in this manner, i.e., such that the surface of the support board is depressed and that the back surface of the support board is protruding, the whole of the support board can be formed to have a uniform thickness, and good moldability is maintained at the time of resin molding.

In the display module of the present invention, a boundary portion between the support section and the depressed section on a surface of the support board preferably has a chamfered shape.

The chamfered shape may be a planar slope or a rounded and curved slope.

By forming the boundary section to have the chamfered shape, it becomes possible to prevent an external force from focusing on the boundary between the support section and the depressed section when the external force is applied to the display board. This further improves the reliability in preventing damage upon application of an external force.

In the display module of the present invention, the support board preferably has a rib which protrudes from a back surface of the support section, and abuts a component mounted on the circuit board to prevent excessive deformation of the support section when the support section is pressed.

When an external force is applied, the support section bends to absorb the external force. However, excessive deformation of the support section is unpreferable. The excessive deformation can be prevented by forming a rib at an appropriate height related to the height of a component mounted on the circuit board.

According to the present invention, there is provided a portable terminal apparatus having a radio communication function including:

a display module having a display board on which a display element displaying an image is mounted; and a chassis on which the display board is mounted and which is placed on a circuit board, wherein the chassis has:

a support board having a support section which supports a portion except for a corner section of the display board and a depressed section which continuously expands from the support section and is formed such that a surface on a side supporting the display board is lower than the support section by one level, and a frame plate which is placed on the circuit board while supporting the support board at a predetermined height with respect to the circuit board.

In the portable terminal apparatus of the present invention as well, a conductive film is preferably formed on a back surface of the support board facing the circuit board when the support board is placed on the circuit board.

The display module of the present invention is suitable for being mounted on a portable terminal apparatus which may be carried around and to which an external force may be applied.

As has been described above, the present invention seeks to make the weight lighter and the number of components smaller than ever before.

DETAILED DESCRIPTION OF THE INVENTION

An embodiment of the present invention will be described below.

Figure 1:
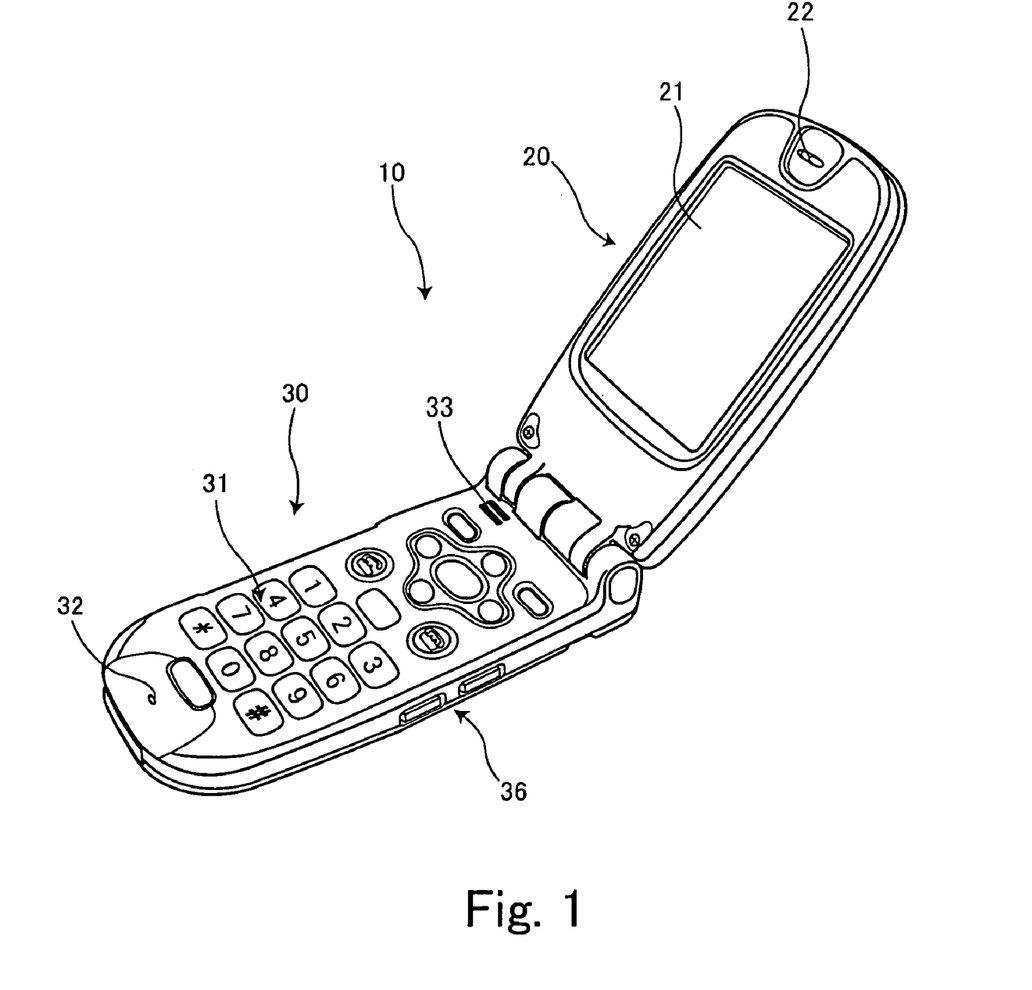
FIG. 1 is an exterior perspective view showing the inner surface side of a portable terminal apparatus of an embodiment of the present invention.
Figure 2:
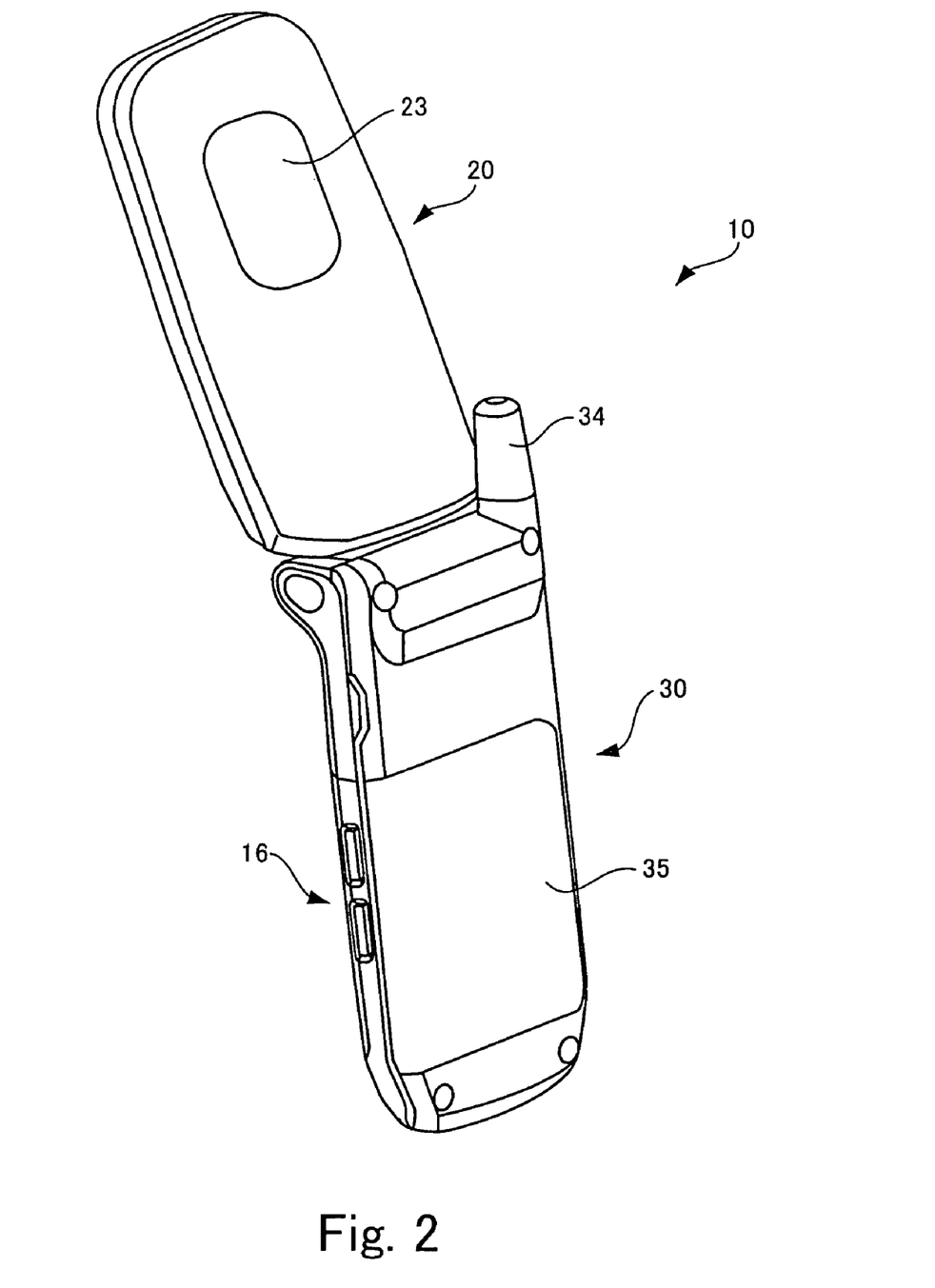
FIG. 2 is an exterior perspective view showing the rear surface side of the same portable terminal as the portable terminal apparatus shown in FIG. 1.

FIG. 1 is an exterior perspective view showing the inner surface side of a portable terminal apparatus of an embodiment of the present invention; and FIG. 2, an exterior perspective view showing the rear surface side of the same portable terminal apparatus as the portable terminal apparatus shown in FIG. 1.

A portable terminal apparatus 10 is composed of an upper housing 20 and a lower housing 30 which open and close. As shown in FIG. 1, a large-area main screen display window 21 for displaying an image which is covered with a window material such as a transparent acrylic plate and an earpiece 22 inside which a small speaker is disposed and which outputs sound when held to the ear are disposed on the inner surface side of the upper housing 20. As shown in FIG. 2, a small-area sub-screen display window 23 for displaying the time or any other image is disposed on the rear surface side of the upper housing 20. The sub-screen display window 23 is also covered with a window material such as a transparent acrylic plate.

As shown in FIG. 1, the lower housing 30 includes, on its inner surface side, a large number of operation buttons 31, a mouthpiece 32 inside which a small microphone is disposed and which transmits the user's voice to the microphone, and a sound outlet 33 inside which a speaker outputting sound loud enough to hear even when the lower housing 30 is held away from the ear is disposed. As shown in FIG. 2, the lower housing 30 includes, on its rear surface side, an antenna 34 and a battery cover 35 which covers a battery loaded in a battery chamber inside the lower housing 30. Operation buttons 36 are also arranged on a side surface of the lower housing 30.

The portable terminal apparatus 10 shown in FIGS. 1 and 2 has the function of making and receiving a phone call, sending and receiving electronic mail, and performing other operations.

Figure 3:
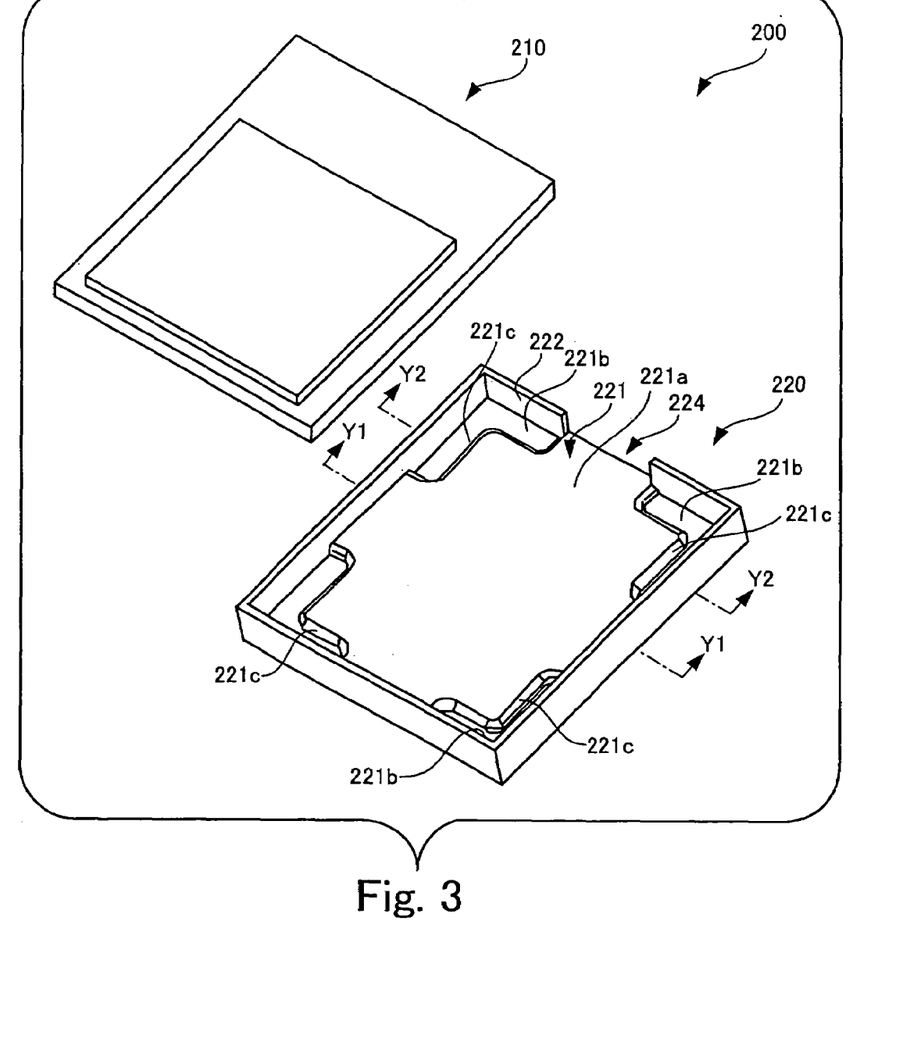
FIG. 3 is an exploded perspective view of a display module disposed inside a sub-screen display window shown in FIG. 2.

FIG. 3 is an exploded perspective view of a display module disposed inside the sub-screen display window 23 shown in FIG. 2.

FIG. 3 shows a display module 200 on an enlarged scale as compared with the sub-screen display window 23 shown in FIG. 2.

The display module 200 is formed of a display board 210 on which an EL display element displaying an image is mounted and which is made of a glass material and a chassis 220 made of a resin material such as ABS.

The chassis 220 is composed of a support board 221 and a frame plate 222 which surrounds the support board 221 to support it. The support board 221 is composed of a support section 221a which supports a portion except for the corner sections of the display board 210 and depressed sections 221b each of which continuously expands from the support section 221a and is formed such that a surface thereof supporting the display board 210 is lower than the support section 221a by one level.

Figure 4:
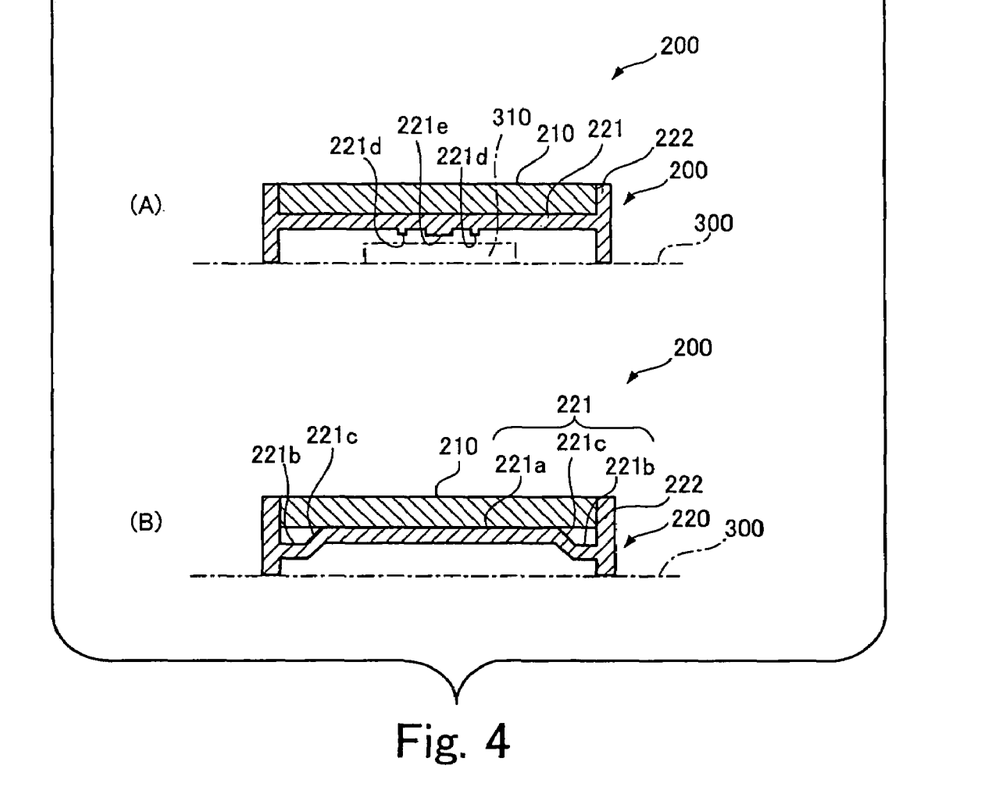
FIG. 4 is a diagram showing sectional views, respectively, taken along arrows Y1-Y1 and Y2-Y2 shown in FIG. 3.

FIG. 4 illustrates sectional views, respectively, taken along arrows Y1-Y1 and Y2-Y2 shown in FIG. 3. In FIG. 3, for illustrative convenience, the arrows Y1-Y1 and Y2-Y2 show the positions of sections of the chassis 220. In contrast, parts (A) and (B) of FIG. 4 also show the display board 210 whose sections are taken at positions corresponding to the positions of the sections of the chassis 220. Part (A) of FIG. 4 is a sectional view taken along the arrow Y1-Y1 shown in FIG. 3; and part (B) of FIG. 4, a sectional view taken along the arrow Y2-Y2 shown in FIG. 3.

As shown in part (B) of FIG. 4, the support section 221a and depressed sections 221b are formed in the support member 221. The support section 221a supports a portion except for the corner sections of the display board 210 and is configured to bend to absorb an external force when the external force is applied to the display board 210. Each depressed section 221b is formed to be lower than the support section 221a by one level, and thus the support board 210 is non-contact with the corner sections of the display board 210. Even if the support section 221a bends, interference between the corner sections of the display board 210 and the support member 221 is avoided, and the occurrence of a defect such as a breakage in the display board 210 is prevented.

Slopes 221c are formed at the boundary portions between the support section 221a and the depressed sections 221b. For this reason, when an external force is applied to the display board 210, the external force is prevented from focusing on an edge of the support section 221a. In this respect as well, a breakage in the display board 210 or the like is prevented with more reliability.

In the embodiment shown here, the slopes 221c are planar slopes (C-planes). Alternatively, rounded and carved slopes (R-planes) may be adopted instead of planar slopes.

The frame plate 222 of the chassis 220 is placed on a circuit board 300. When the frame plate 222 is placed on the circuit board 300, a closed space is formed among the circuit board 300, frame plate 222, and the back surface of the support board 221. As shown in part (A) of FIG. 4, a circuit component 310 such as an IC which also serves as a noise source is mounted on the circuit board 300 within the closed space.

A notch section 224 through which a flexible board (not shown) extending from the display board 210 passes is formed in the frame plate 222, as shown in FIG. 3.

Figure 5:
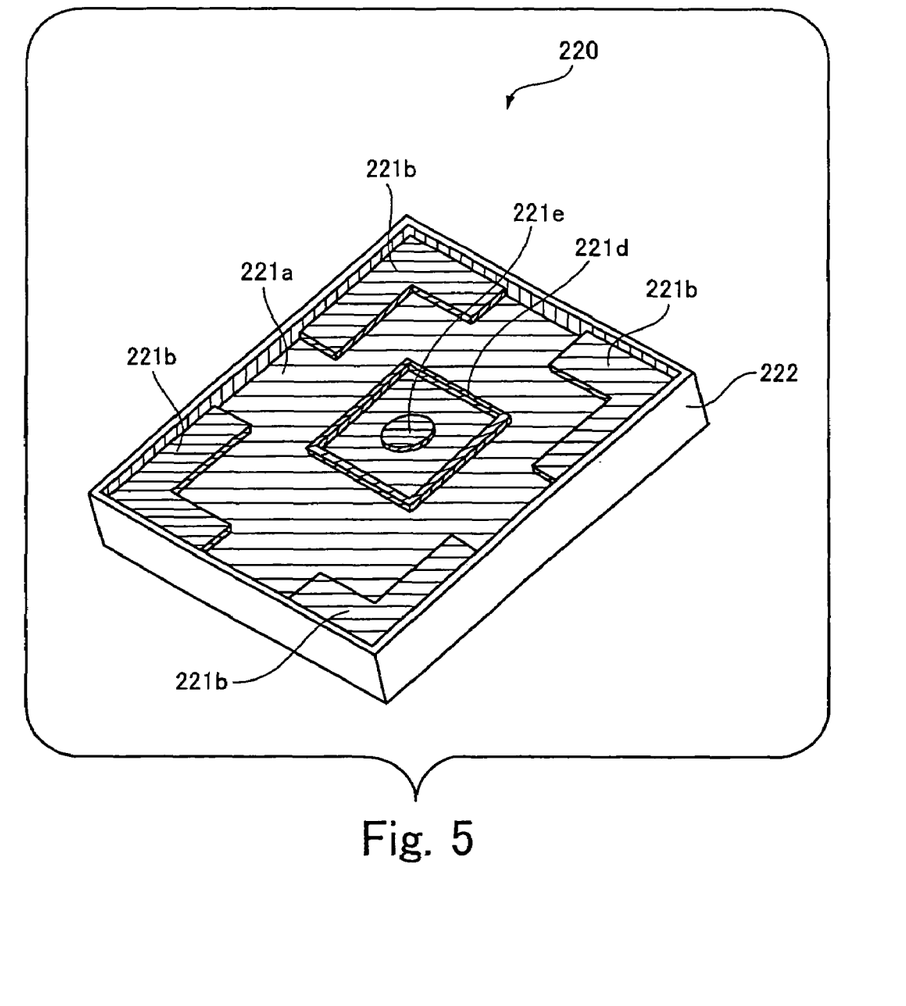
FIG. 5 is a perspective view showing the rear surface side of a chassis shown in FIG. 3.

FIG. 5 is a perspective view showing the rear surface side of the chassis 220 shown in FIG. 3.

Each depressed section 221b is so formed as to protrude from the support section 221a by one level on the rear surface side. For this reason, the depressed section 221b is formed to have the same thickness as that of the support section 221a, as shown in part (B) of FIG. 4, and high moldability is maintained at the time of molding.

As shown in FIG. 5, a protruding rib 221d is formed on the back surface of the support section 221a. A basin 221e which is the trace of a gate through which resin is poured at the time of molding is formed at a position surrounded by the rib 221d. Since the basin 221e is formed at the position surrounded by the rib 221d, the basin 221e only needs to be lower than the rib 221d. The basin 221e protruding from the back surface of the support section 221a poses no problem.

As shown in part (A) of FIG. 4, the rib 221d is located immediately above the circuit component 310 mounted on the circuit board 300. The rib 221d is configured to abut against the circuit component 310 when a strong external force is applied to the display board 210, and the support section 221a bends by a predetermined amount. This arrangement prevents excessive bending of the support section 221a.

A metal film is formed by, e.g., deposition, plating, or the like across the back surface of the chassis 220 marked with diagonal lines in FIG. 5. The metal film is configured to be connected to electrical ground on the circuit board when the chassis 220 is mounted on the circuit board 300. For this reason, the metal film acts as a shield, thereby preventing radiation noise and the like from the circuit component 310 from leaking outside.

In the example shown here, the metal film is given the shielding effect. However, the shielding effect may be produced by forming the chassis itself of a conductive material.

The example has described the display module 200 mounted on the portable terminal apparatus 10 shown in FIGS. 1 and 2. The present invention can also be applied to the display module itself regardless of whether it is mounted on the portable terminal apparatus 10.

What is claimed is:

1. A display module comprising:
   a display board on which a display element displaying an image is mounted; and
   a chassis on which the display board is mounted and which is placed on a circuit board,
   wherein the chassis has:
      a support board having a support section which supports a portion except for a corner section of the display board and a depressed section which continuously expands from the support section and is formed such that a surface on a side supporting the display board is lower than the support section, and a frame plate which is placed on the circuit board while supporting the support board at a predetermined height with respect to the circuit board.

2. The display module according to claim 1, wherein a conductor film is formed on a back surface of the support board facing the circuit board when the support board is placed on the circuit board.

3. The display module according to claim 1, wherein the depressed section is formed so as to protrude on a side of the back surface of the support board.

4. The display module according to claim 1, wherein a boundary portion between the support section and the depressed section on a surface of the support board has a chamfered shape.

5. The display module according to claim 1, wherein the support board has a rib which protrudes from a back surface of the support section, and abuts a component mounted on the circuit board to prevent excessive deformation of the support section when the support section is pressed.

6. A portable terminal apparatus having a radio communication function comprising:

a display module having a display board on which a display element displaying an image is mounted; and a chassis on which the display board is mounted and which is placed on a circuit board, wherein the chassis has:

a support board having a support section which supports a portion except for a corner section of the display board and a depressed section which continuously expands from the support section and is formed such that a surface on a side supporting the display board is lower than the support section, and a frame plate which is placed on the circuit board while supporting the support board at a predetermined height with respect to the circuit board.

7. The portable terminal apparatus according to claim 6, wherein a conductive film is formed on a back surface of the support board facing the circuit board when the support board is placed on the circuit board.

* * * * *